Jan. 12, 1960

E. C. HELMKE 2,920,332

THREAD CHASING ATTACHMENT FOR LATHES WITH
INTERCONNECTED CARRIAGE DRIVE AND
TOOL CROSS SLIDE FEED MEANS

Filed Aug. 19, 1957

6 Sheets-Sheet 1

INVENTOR.
EDWARD C. HELMKE

BY

Andrus, Sceales & Starke

Attorneys

INVENTOR.
EDWARD C. HELMKE

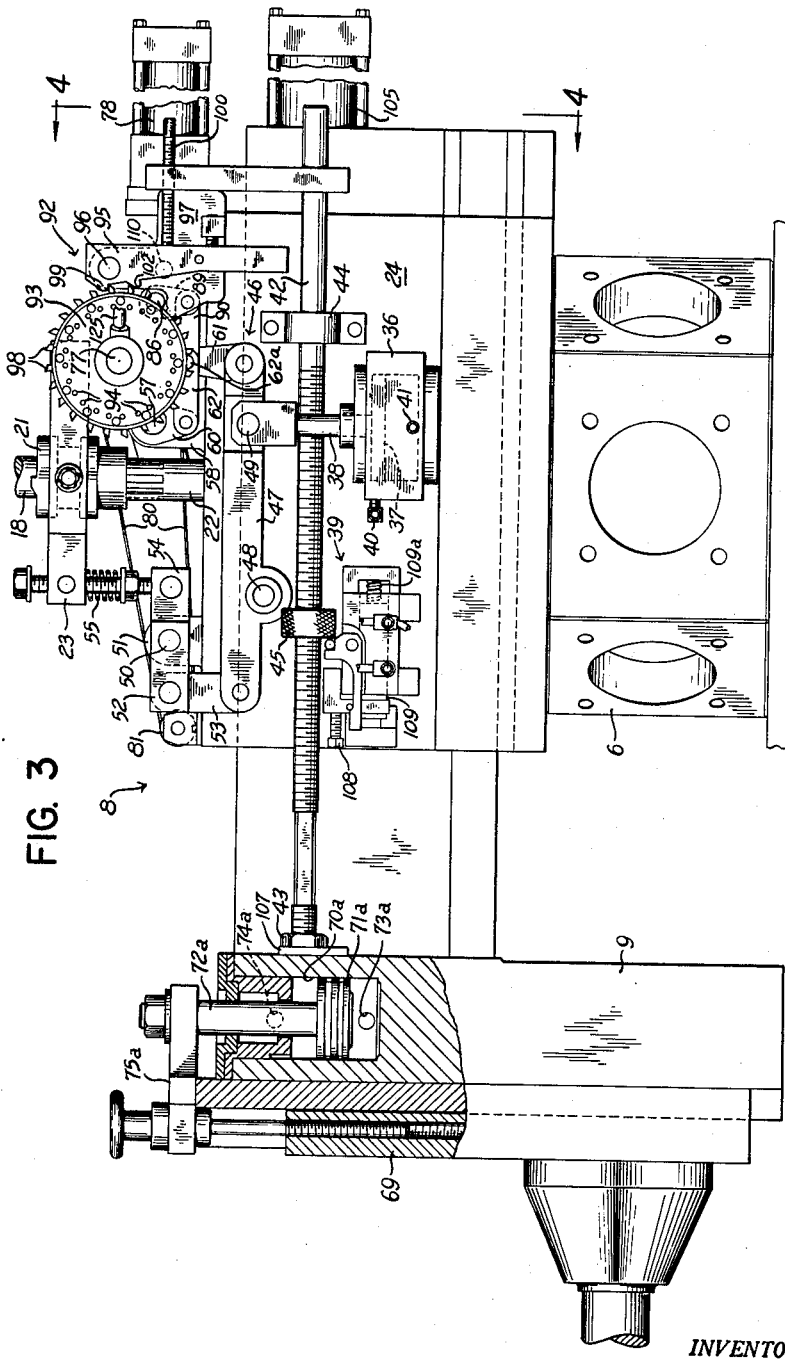

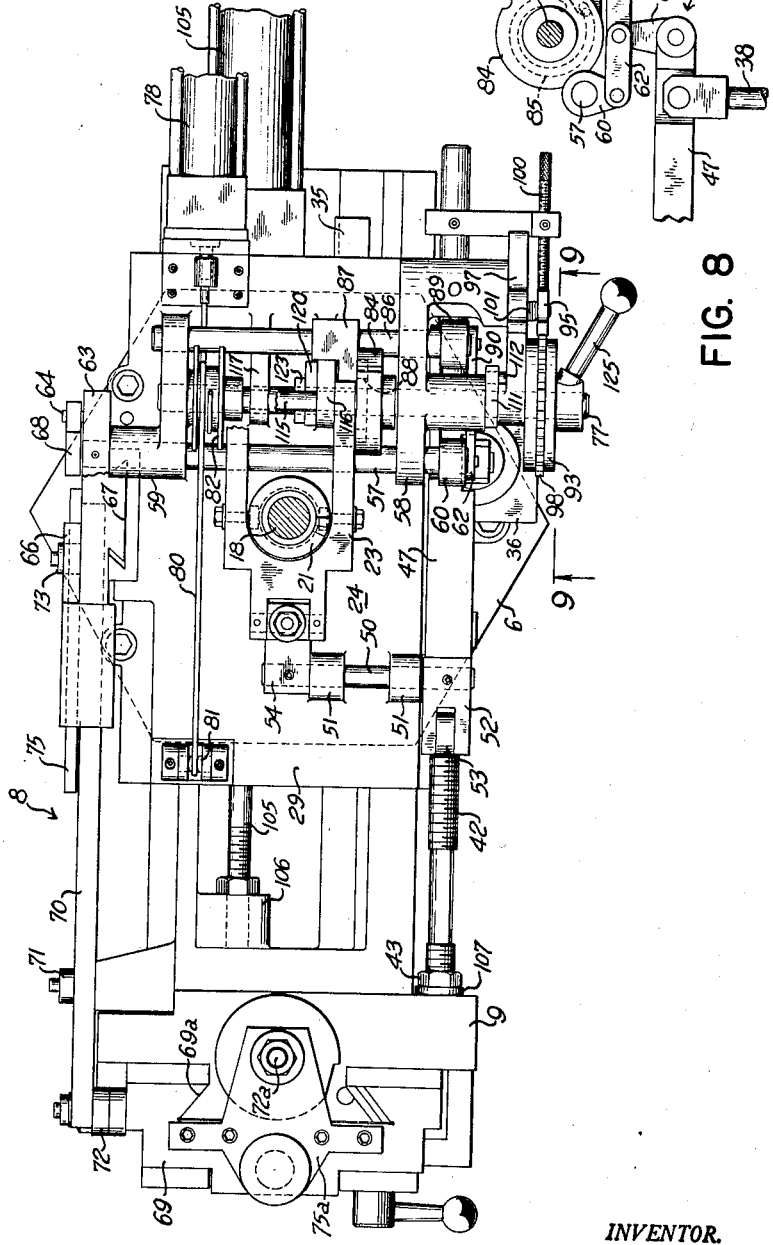

Jan. 12, 1960

E. C. HELMKE 2,920,332

THREAD CHASING ATTACHMENT FOR LATHES WITH
INTERCONNECTED CARRIAGE DRIVE AND
TOOL CROSS SLIDE FEED MEANS

Filed Aug. 19, 1957

6 Sheets-Sheet 5

*INVENTOR.*
EDWARD C. HELMKE
BY

*Andrus, Sceales & Starke*
Attorneys

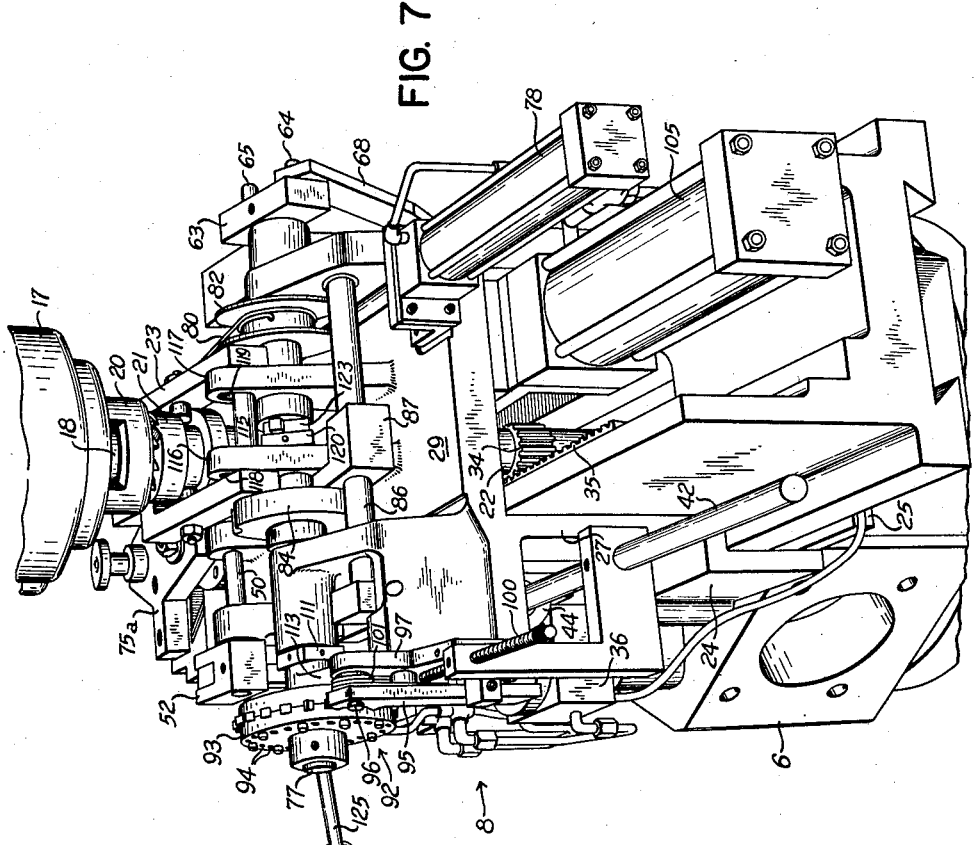

United States Patent Office 2,920,332
Patented Jan. 12, 1960

2,920,332

THREAD CHASING ATTACHMENT FOR LATHES WITH INTERCONNECTED CARRIAGE DRIVE AND TOOL CROSS SLIDE FEED MEANS

Edward C. Helmke, Madison, County of Dane, Wis., assignor to Gisholt Machine Company, Madison, Wis., a corporation of Wisconsin Application August 19, 1957, Serial No. 679,027

9 Claims. (Cl. 10—101)

This invention relates to a thread chasing attachment which finds particular utility when used in conjunction with a turret lathe.

Heretofore, in providing a thread chasing attachment for the turret of a lathe, problems have arisen in obtaining the required degree of accuracy and flexibility in feed and adjustment and in providing a wide range of operation of the tool. These problems are aggravated by the handicaps due to space and weight limitations where the attachment must be mounted on a turret.

An object of the invention is to provide a relatively lightweight thread chasing attachment which is highly versatile in performing its intended functions and provides a wide operating range.

Another object of this invention is to provide a thread chasing attachment having novel means for automatically engaging and disengaging its various component parts.

Another object of the invention is to provide an improved and lightweight thread chasing attachment having means for automatically interrupting the forward stroke of the tool at the end of a pass and removing the tool out of the work, said attachment also having means for automatically returning the tool to its starting position, the first said means then being operative to start a forward stroke and simultaneously move the tool into the work.

Still another object of the invention is to provide an attachment of the above type having metering mechanism automatically operated at the end of each cutting pass to increase the depth of cut of the tool a predetermined increment and then stop the attachment at the end of the desired number of passes.

Figure 4:
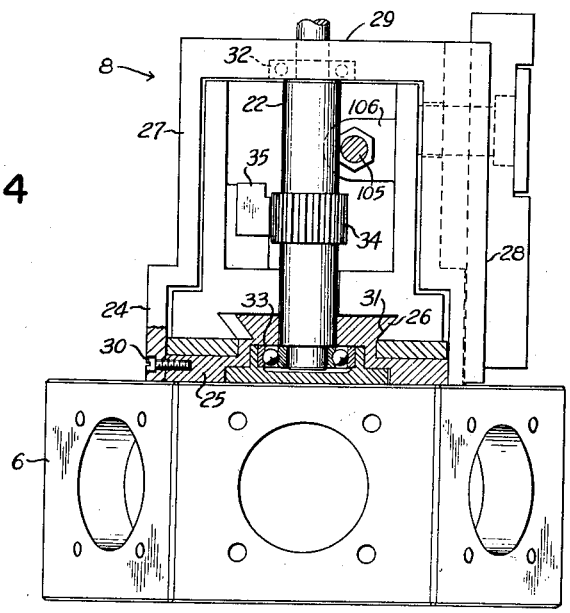
Figure 1:
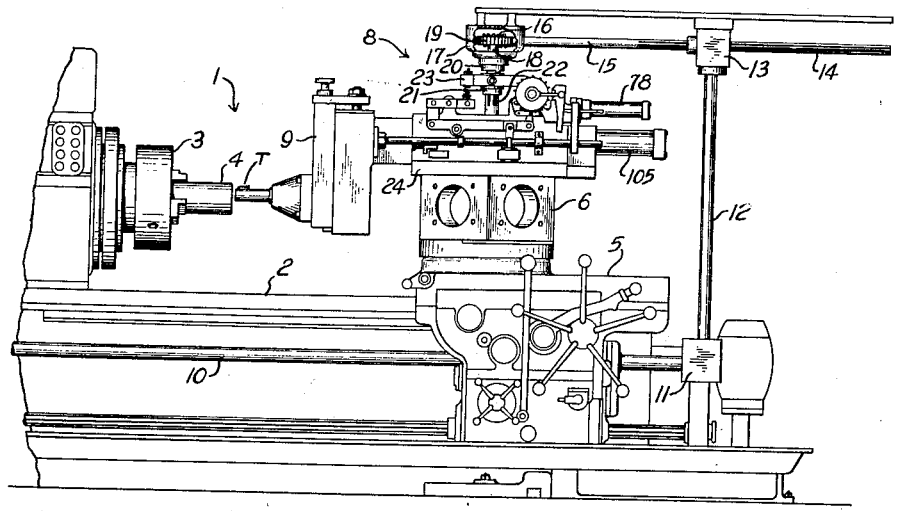
Figure 2:
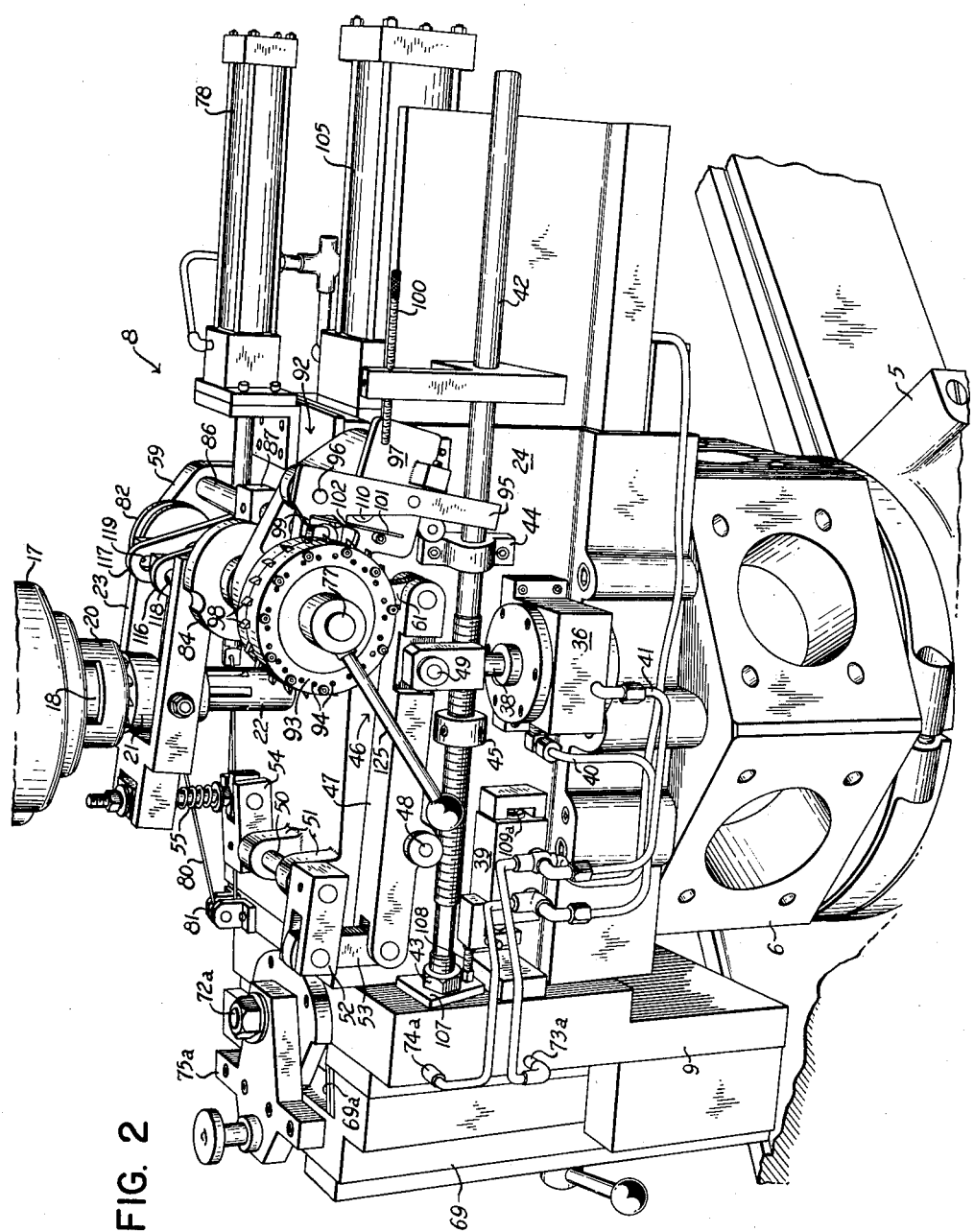
Figure 6:
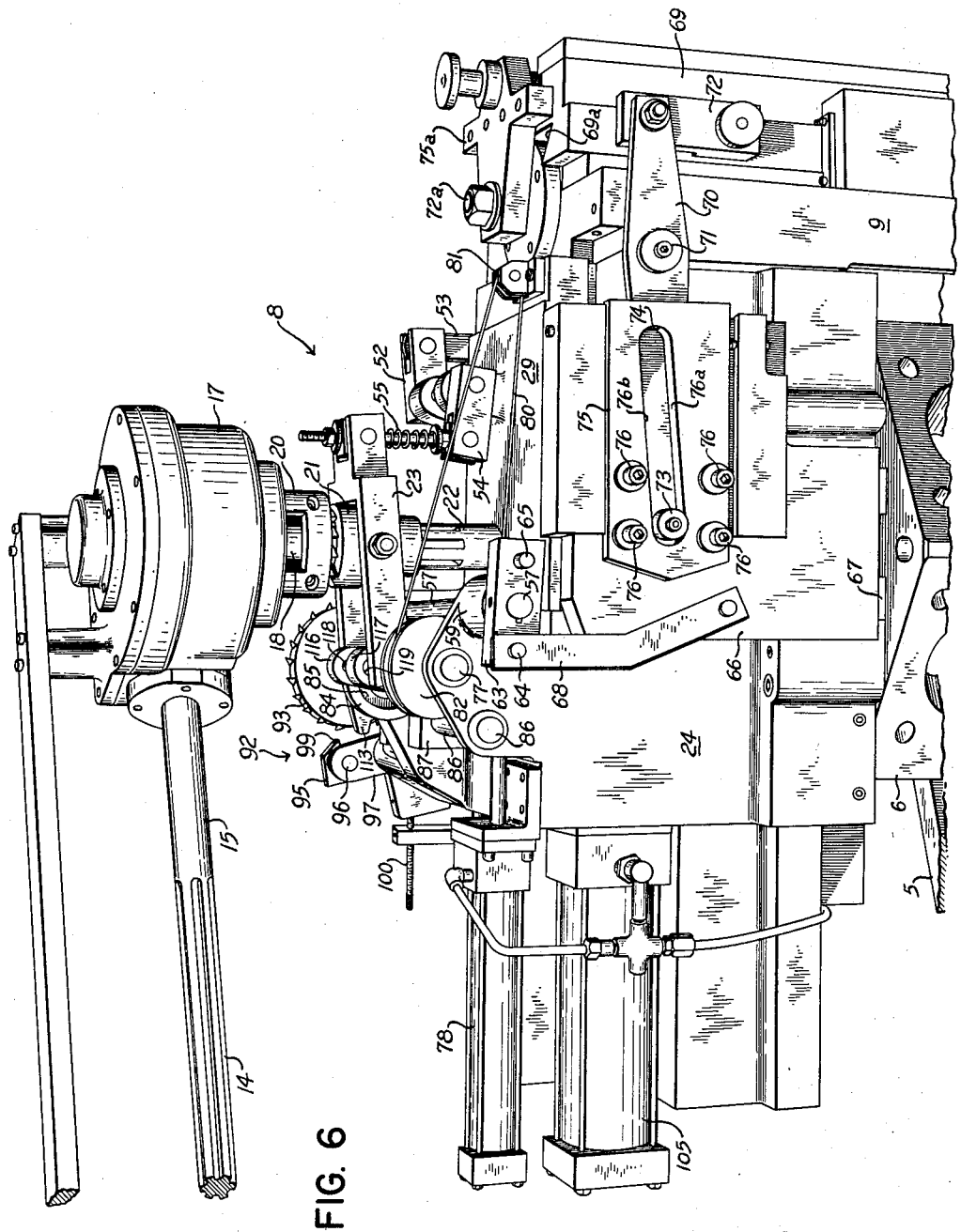

Other objects and advantages of the invention will appear hereinafter as this disclosure progresses, reference being had to the accompanying drawings in which:

Figure 1 is a side elevational view of the invention as applied to a turret lathe, Figure 2 is a perspective view of the thread chasing attachment as shown in Figure 1, but on an enlarged scale, Figure 3 is a near side elevational view of the attachment shown in Figure 2, but on a further enlarged scale and with certain parts in section and broken away for the sake of clarity in the drawings, Figure 4 is a rear view taken generally from line 4—4 in Figure 3 and with numerous parts broken away and removed for clarity, Figure 5 is a plan view of the attachment as shown in Figure 3, certain parts shown in section or broken away for clarity of the drawing, Figure 6 is a far side perspective view of the device.

Figure 7 is a perspective view taken from above the rear end of the thread chasing attachment, Figure 8 is an elevational diagrammatic view, on a reduced scale showing the feed cam and certain linkage connections of various parts, and Figure 9 is an elevational sectional view showing one of the clutch releasing means, the view being taken on line 9—9 of Figure 5.

Referring in greater detail to the drawings, particularly Figure 1, the thread chasing attachment is shown as embodied in a turret lathe 1 having the conventional bed 2 and rotatably driven chuck 3 which carries the workpiece 4. A carriage 5 is slidably supported on the bed for movement therealong and a turret head 6 is secured on top of the carriage to receive a plurality of tools, not shown, in the well known manner.

Ordinarily, the entire cariage and turret are moved along the bed toward and away from the workpiece 4. For purposes of this disclosure, the workpiece is a tubular member and an internal thread is to be formed at its end. The carriage assembly is of considerable weight and size, and even with power feed it is difficult and power consuming to quickly reciprocate this carriage along the bed as, for example, when it is desired to take a number of passes in cutting a thread.

In accordance with this invention, a thread cutting attachment 8 is secured to the top side of the conventional turret head. This attachment has a relatively lightweight, reciprocatory tool carrying portion or head 9 which can quickly and efficiently make a variable number of thread cutting passes on the workpiece at variable feed rates, thereby eliminating the necessity of reciprocating the large mass of the carriage assembly when forming a thread.

To advance the sliding head 9 and its tool T forward, that is, toward the workpiece or to the left as viewed in Figures 1, 2, 3 and 5, power is transmitted from the lathe feed shaft 10, through a conventional change speed gear box 11, shaft 12, and into the change gear drive box 13. Within box 13 and secured to the upper end of shaft 12 is a bevel gear, not shown, which is in constant mesh with a second bevel gear, not shown, slidable along the splined portion 14 of the shaft 15. At the forward end of shaft 15 is secured a worm gear 16 within gear housing 17. Shaft 18 is also rotatably mounted within housing 17 and has a worm wheel 19 secured at its upper end which is in constant mesh with worm 16.

A clutch collar 20 is rigidly secured to the lower end of shaft 18 and forms a disconnectible driving engagement with the shiftable clutch collar 21 of the clutch shaft 22. Clutch collar 21 is slidable on the upper splined end of shaft 22 and is shifted by movement of either end of the yoke 23 by means to be described.

The thread chasing attachment includes a housing or stationary support structure 24 which is rigidly secured to the top side of turret head 6, as follows. As best shown in Fig. 4, a base plate 25 is secured directly to the turret head and has a V-shaped way portion 26 extending along its length. The support structure 24 is of generally inverted channel shape in cross section and includes side walls 27, 28 and a top 29. Cap screws 30 extend through walls 27 and 28 to secure the hollow support 24 to the guideway plate 25.

The sliding head 9 of the attachment has a V-shaped guideway 31 which is complementary to the way 26 and embraces the latter so as to be in slidable engagement therewith. Head 9 is thus reciprocable within the housing 24 so as to move tool T over the surface of the workpiece on which it is desired to form a thread. The head itself is substantially hollow, being generally channel-shaped in cross section, as shown in Figure 4. This construction not only reduces the mass of the reciprocatory head, but permits utilization of the space within the head for other component parts.

Drive means are provided for moving the head 9 relative to the housing 24 and in the tool advance direction. This means provide a considerable range of reciprocatory movement of the head for forming long threads. The drive means utilized is so arranged, however, that it is very compact and efficiently located within the housing.

The clutch shaft 22 extends downwardly through housing 24 and is mounted in suitable anti-friction bearing assemblies 32 and 33. A pinion 34 secured to shaft 22 is in constant mesh with the rack 35 secured to the inner side of housing wall 27. Rotation of shaft 22 when the one way clutch collar 21 is engaged advances the tool toward the workpiece.

Means are provided for automatically disengaging or engaging the drive clutch when the tool has reached the end of its forward stroke or the end of its return stroke, respectively.

A servo-motor is provided which takes the form of a vertically positioned cylinder 36 mounted on the side of housing 24 and a piston 37 slidable therein which has a rod 38 extending upwardly therefrom.

A valve 39 is also secured to the housing and is connected by conduits 40, 41 to the upper and lower sides, respectively, of the cylinder. The valve serves to direct fluid, such as air, to either the upper or lower end of the cylinder 36, which in turn disengages or engages the drive clutch and operates other parts of the attachment, as will appear.

A rod 42 is secured at its forward end by a nut 43 to the head 9 for reciprocation therewith. A guide bracket 44 is secured to the housing 24 for slidingly supporting the rod 42. A valve trip collar 45 is adjustably fixable along the threaded portion of rod 42. The end of the forward stroke of the tool is determined by the position of the collar along the rod, because the collar is adapted to contact valve 39 (Fig. 3) when the end of the forward stroke is reached. At this time, the valve directs air through conduit 40 to the top of cylinder 36 forcing the piston rod 38 downwardly. This movement disengages the drive clutch through the linkage 46 to be described. As well as stopping forward movement of the tool, the linkage at the same time moves the tool away from the workpiece, or in a downwardly direction as illustrated in the drawings, to provide tool relief.

The linkage 46 includes an arm 47 pivoted at 48 to the housing, and pivotally connected at 49 to the piston rod 38. A short shaft 50 is oscillatingly mounted on the top of the housing in suitable brackets 51. An arm 52 is rigidly secured on shaft 50 and it pivotally connected at its forward end by link 53 to the forward end of arm 47. Another arm 54 is also rigidly secured to shaft 50 and is connected to the forward end of shifting yoke 23 by the spring-strut member 55. The strut is of the telescopic type which has a spring biasing it to a limited extended position.

When the piston moves downwardly, arm 47 is pivoted about point 48 and shaft 50 caused to rotate in a clockwise direction, as viewed in Fig. 3. The yoke 23 is then pulled downwardly by strut 55, declutching the drive and stopping forward or advance stroke of the head.

As previously mentioned, this downward movement of the piston also moves the tool away from the work, that is, it moves the tool out of the thread in preparation for the return stroke of the head to the starting position. This is accomplished as follows.

A shaft 57 is oscillatingly mounted on the top of housing 24 in the upstanding brackets 58, 59. A short arm 60 is secured to one end of shaft 57 and extends generally downwardly therefrom. A link 61 is pivotally attached to the rear end of arm 47 and is pivotally connected by link 62 with arm 60. Link 90 is also pivotally connected at 62a to the link 61 and the other end of link 90 may be considered as being fixed for the present. Thus, downward movement of piston rod 38 and its associated link 61 pulls arm 60 to the right (Fig. 3) through link 62 and oscillates shaft 57 in a counterclockwise direction. This is a very quick movement and the shaft rotates approximately 15 degrees.

As shown in Fig. 6, at the other end of shaft 57 is secured a pivot lever 63 having a pin 64, 65 in each of its ends. The purpose of having a connection at each end is to reverse the direction of tool feed, that it, either up or down, as will appear.

A slider 66 is shiftable in a vertical direction on the guideway 67 of the housing wall. A link 68 pivotally connects the slider to either end of lever 63. When attached at 64, as shown in the drawings, the tool feed direction is upwardly and an internal thread can be formed in the tubular workpiece 4. The vertical movement of the slider is translated to the vertically movable tool slide 69 by the actuating arm 70 which is pivoted at 71 to the housing. A link 72 pivotally connects the arm 70 to the tool slide. The slide is reciprocally mounted on the head 9 by the conventional V-shaped guideways 69a.

The rear end of arm 70 has a cam follower or roller 73 secured thereto which is adapted to move in a cam track 74 of the cam plate 75. The cam plate is rigidly secured to the housing and the particular plate 75 illustrated is for cutting a tapered thread. This is accomplished by the roller 73 following along in track 74 as the tool advances over the workpiece, or to the right as viewed in Fig. 6.

Anti-backlash means are provided for holding the roller 73 tightly against that side of the cam track 74 being used in order to prevent the roller from simply "floating" in the track. Any backlash in the linkage from the piston rod 38 to the tool slide 69 is thus compensated for to insure extreme accuracy of the thread being formed and smooth operation of the attachment.

This means takes the form of a double acting piston and cylinder unit operatively connected between the tool slide and head proper. As shown in Fig. 3, a cylinder 70a is formed in the upper portion of the head 9 and has a piston 71a and piston rod 72a extending upwardly therefrom. Ports 73a and 74a are provided in the ends of the cylinder for admitting air to the lower and upper end respectively, of the cylinder. A cross bar 75a rigidly connects the piston rod and slide together to insure unitary movement.

During thread cutting operation, with the attachment set as shown in the figures, the upper cam track side 76b is bearing downwardly against the cam follower 73 (Fig. 6), biasing the tool slide 69 in an upward direction. At this time air is admitted to the upper port 74a of the cylinder, tending to urge the piston and slide downwardly thus holding the roller 73 firmly against the cam track side 76b.

When the feed of the tool is in the downward direction (link 68 connected to pin 65) the lower side 76a of the track bears upwardly against the cam roller 73 and air is admitted through the lower port 73a of the cylinder to urge the slide in the upward direction, holding the roller 73 firmly against the lower track side 76a.

Air is admitted to the cylinder 70a through the valve 39 simultaneously with admission of air to the lower end of cylinder 36 which, as described, commences the advance stroke and moves the tool into the workpiece.

The cam plate is quickly attachable by cap screws 76 to the slider 66 for reciprocation therewith. As the tool advances, the vertical position of the follower 73 raises which correspondingly and progressively lowers the tool as it advances to generate a taper.

If it is desired to cut a straight thread, the cam plate 75 can be quickly replaced by one having a straight cam surface, that is, one that is horizontal. Thereby the roller 73 moves in a horizontal direction, rather than raising during its forward movement as above described.

With the above construction, either a straight or tapered thread can be easily and quickly provided for. In addition, the vertical direction of tool feed can be readily changed by the choice of either connection between lever 63 and arm 68.

The sharp oscillatory movement of the shaft 57 by the piston either provides tool relief or forces the tool toward the workpiece to a cutting position as determined by means to be presently described.

A feed regulating mechanism is provided which is adjustable to determine the number of passes the tool will make in forming a thread. This mechanism includes a rotatable member in the form of a main feed shaft 77 which is rotatably mounted on top of the housing 24 in the brackets 58, 59. This shaft is rotatably driven in a counterclockwise direction (Fig. 3) by the single acting cylinder and piston arrangement 78, the cylinder of which is secured to the top of the housing 24 in a horizontal position. The rotation of the shaft is intermittent or in increments, as determined by a metering or an escapement mechanism later described.

Attached to the free end of the piston rod is a cable 80 which extends forwardly and over a pulley 81 mounted on the forward end of the housing. The cable then returns and is trained around and secured at its end to a drum 82. The drum is secured to the feed shaft 77 and when air is admitted to the rod end of the cylinder to retract the piston rod, the drum is rotatably driven in a counterclockwise direction (Fig. 3) to advance the tool into the workpiece.

A feed cam 84 is also rigidly secured to the shaft 77 and, as shown in Fig. 8, has a spiral cam track 85 formed in its side.

A third shaft 86 is oscillatingly mounted on the top of the housing 24 in brackets 58, 59 and has a lever (Figs. 5 and 7) 87 secured thereto. A pin 88 is fixed on the free end of the lever and is adapted to ride in the cam track 85. Shaft 86 can only rotate when the shaft 77 is rotated, being otherwise locked by the cam and pin 88.

At the beginning of the formation of a thread, the feed shaft 77 is in such a position so that the pin 88 is in that end of the cam track 85 farthest from the shaft 77. As the shaft 77 is permitted to turn (by the metering mechanism to be described) at the end of a pass of the tool over the work, the cam track 85 forces the pin 88 to move inwardly toward the center of the cam member 84. This rotates lever 87 and shaft 86 in a clockwise direction (Fig. 3). Shaft 86 has a downwardly extending arm 89 secured thereto which then rotates with it. The free end of arm 89 is pivotally connected by a link 90 to the link 61.

Therefore, as the feed shaft 77 and cam 84 rotate, the shaft 86 is also caused to rotate and, through the double links 90 and 62, rotates the shaft 57 in the clockwise direction, advancing the tool into the work. Different positions of shaft 77 vary the longitudinal position of pivot 62a when lever 47 is in the tool feed position shown in Fig. 3.

As previously mentioned, this advance of the tool into the work is made in predetermined increments or passes. That is to say the rotation of the feed shaft is intermittent as determined by the escapement mechanism 92.

This metering or escapement mechanism includes a ratchet wheel 93 fixed to shaft 77 and which has a plurality of teeth 98 around its periphery, the number of which determines the number of passes to be made over the workpiece in forming the thread. The teeth are held in position by individual set screws 94 and by loosening the latter any of the teeth may be withdrawn into the wheel so as to be unengageable by the escapement lever 95. In other words, the spacing or number of teeth may be varied so as to determine the number of passes to be made in forming a thread.

The lever 95 is swingably mounted on stub shaft 96 on plate 97 and in the position shown in Fig. 3 engages one of the ratchet teeth 98 with its upper catch 99. See Fig. 9. During one cutting pass of the tool, the lever holds the wheel 93 and its feed shaft 77 against rotation, that is, against the rotating force of cylinder and piston 78. A coil spring 101 (Figs. 2 and 7) on shaft 96 biases the lever 95 to the position shown, where the upper catch 99 is in engagement with the wheel.

When the head 9 reaches the end of its stroke, its adjustable stop 100 swings the lever 95 to the left. This lever movement disengages catch 99 from the wheel and causes the lower catch 102 to be engaged with the following tooth 103 on the wheel. When the stop 100 moves to the right with the return movement of the head 9, the spring 101 swings lever 95 back to the right where catch 99 again engages a tooth of the wheel. Thus, the feed cam has permitted shaft 86 to rotate shaft 57 slightly, advancing the depth of cut of the tool for the next pass.

The power for the return stroke of the head 9 is furnished by the single acting air cylinder and piston device 105. This cylinder is fixed to housing 24 and its piston rod extends in a forward direction through the housing. The forward end of the piston rod is attached to the head 9 at 106 (Figs. 4 and 5). Air pressure is always present in the rod end of the cylinder of device 105 and returns the tool head 9 to the starting position when the clutch is disengaged. Other resilient means could be used to bias and return the head 9, for example, a spring.

In reaching the starting position, or the extreme right as viewed in Fig. 3, a stop surface 107 has moved arm 108 attached to the valve stem 109. The valve stem 109 is biased to the left by spring 109a, whereby air is admitted to the top of cylinder 36 under the control of valve trip collar 45, thus releasing the drive clutch. However, when reaching the starting position as mentioned, the plunger movement to the right causes air to be admitted through conduit 41 to the bottom of cylinder 36. Consequent upward movement of piston rod 38 causes linkage 47, 53, 52, 54 to compress the spring of strut 55 and engage the drive clutch 21. At the same time, the shaft 57 is rotated slightly in a clockwise direction to move the tool toward the work to the new cutting depth as determined by the new index position of the ratchet wheel. The tool then begins to again move over the workpiece.

When the desired number of passes has been completed, the escapement lever is completely disengaged from contact with the ratchet wheel. A trip collar or lever 111 is rigidly secured to shaft 77 and has a pin 112 secured at its outer end. After shaft 77 has completed its revolution or cycle, pin 112 bears against the reset arm 113 (Figs. 5 and 9) which is loosely mounted on shaft 77. The outer end of arm 113 contacts a projection 114 on the front side of plate 97 and normally maintains the plate 97 in the operative position shown and against the tendency thereof to swing clockwise by gravity on pivot point 110. Continued rotation of shaft 77 causes pin 112 to push arm 113 out of holding contact with plate 97. The entire lever carrying plate 97 then swings by gravity in a clockwise direction about its point 110 of pivotal attachment to the housing.

The purpose of completely disengaging the escapement lever from the ratchet wheel is to permit the latter, and its shaft 77, to be freely rotated through the final arc of its travel. This final movement declutches the drive shaft 22 by permitting the rear end of yoke 23 to drop, as follows.

As shown in Figures 7 and 9, a cross bar 115 is secured between the bifurcated end of the clutch yoke 23. Two upstanding projections 116, 117 are formed integrally with the top of the housing 24 and each have a vertically arranged slot 118, 119 through which the bar 115 passes. The slots serve to position the yoke in a fore and aft direction, yet permit the yoke to move vertically therein.

Mounted between the projections 116, 117 and freely rotatable on shaft 77 is a clutch release arm 120 having a cut away portion 121 upon which the bar 115 is adapted to be seated. When in the position shown in Fig. 9, the arm 120 holds the yoke 23 up in the engaged position, assuming, of course, that the front end of yoke 23 is also in the up position.

Another indexing trip collar 123 is keyed to shaft 77 and has a pin 124 fixed thereto. In the final arcuate travel of the shaft 77, at the end of the predetermined number of threading passes, the pin 124 comes to bear against release arm 120. Upon further continued rotation in the direction indicated by the curvilinear arrow of Fig. 9, the arm 120 is rotated in a counterclockwise direction. The bar 115 and its associated yoke 23 are then free to drop, thereby declutching the drive.

A manually operated handle 125 is used to rotate the shaft 77 in the clockwise direction for returning it to the starting position.

The main drive may thus be declutched by permitting either end of the yoke to drop. The front end is declutched at the end of every thread cutting pass by actuation of the piston rod 38. Upon the completion of the desired number of passes, when the feed shaft 77 has completed its cycle or revolution, the rear end of the yoke 23 is permitted to drop to declutch the drive.

By means of this invention, there has been provided a comparatively lightweight, high speed, thread cutting attachment which is economical and highly efficient in operation. It is easily adaptable for attachment to machines of conventional design, such as the turret laths illustrated. The attachment is flexible in performing its functions, providing for cutting comparatively long threads, variable feed rate, variable number of cutting passes and for either straight or tapered threads.

Various modes of carrying out the invention are contemplated as being within the scope of the following claims particularly pointing out and distinctly claiming the subject matter which is regarded as the invention.

I claim:

1. A thread chasing attachment comprising, a support structure, a head reciprocatingly mounted on said structure for movement adjacent a workpiece in tool advance and return directions, said head including a tool slide mounted thereon for reciprocation between tool cutting and relief positions, drive means between said head and said structure for sliding said head in the advance direction, a clutch for said drive means, servo-motor means having a linkage connection with said clutch and also having another linkage connection with said tool slide, valve means in communication with said servo-motor means and actuated by said head at the end of an advance stroke to cause said servo-motor means to disengage said clutch and move said tool slide to a relief position, and means constantly biasing said head in the return direction whereby said head is returned to its initial position upon disengagement of said clutch, the construction being such that said valve means is actuated by said head at the end of a tool return stroke to cause said servo-motor means to engage said clutch and move said tool slide to a cutting position.

2. A thread chasing attachment comprising, a support structure, a head reciprocatingly mounted on said structure for movement adjacent a workpiece in tool advance and return directions, said head including a tool slide mounted thereon for reciprocation between tool cutting and relief positions, drive means between said head and said structure for sliding said head in the advance direction, a clutch for said drive means, servo-motor means having a linkage connection with said clutch and also having another linkage connection with said tool slide, a rotatable member mounted on said structure and having a connection with the second-named linkage, means to rotate said member in a tool feed direction whereby said slide moves toward a tool cutting position adjacent the workpiece, valve means in communication with said servo-motor means and actuated by said head at the end of an advance stroke to cause said servo-motor means to disengage said clutch and move said tool slide to a relief position, metering means between said rotatable member and said structure and actuated by said head at the end of the advance stroke to free said member for limited rotational movement to index said slide, and resilient means constantly biasing said head in the return direction whereby said head is returned to its initial position upon disengagement of said clutch, the construction being such that said valve means is actuated by said head at the end of a tool return stroke to cause said servo-motor means to engage said clutch and move said tool slide to a cutting position.

3. The attachment of claim 2 which includes means connected between said rotatable member and said clutch and operable after a predetermined number of tool advance strokes to disengage said clutch.

4. A thread chasing attachment comprising, a support structure, a head reciprocatingly mounted on said structure for movement adjacent a workpiece in tool advance and return directions, said head including a tool slide mounted thereon for reciprocation between tool cutting and relief positions, drive means between said head and said structure for sliding said head in the advance direction, a clutch for said drive means, servo-motor means having a linkage connection with said clutch and also having another linkage connection with said tool slide, a rotatable member mounted on said structure and having a connection with the second-named linkage, means to rotate said member in a tool feed direction whereby said slide moves toward a tool cutting position adjacent the workpiece, valve means in communication with said servo-motor means and actuated by said head at the end of an advance stroke to cause said servo-motor means to disengage said clutch and move said tool slide to a relief position, metering means between said rotatable member and said structure and actuated by said head at the end of the advance stroke to free said member for limited rotational movement to index said slide, power operated means to move said head in the return direction, said valve means being actuated by said head at the end of a tool return stroke to cause said servo-motor means to engage said clutch and move said tool slide to a cutting position, a releasable arm between said clutch and said member and shiftable between clutch operative and inoperative positions, and a trip carried by said rotatable member and engageable with said arm to shift the latter to the clutch inoperative position when said member has rotated a predetermined amount.

5. A thread chasing attachment comprising, a support structure, a head reciprocatingly mounted on said structure for movement adjacent a workpiece in tool advance and tool return directions, said head including a tool slide mounted thereon for reciprocation in a direction substantially normal to said head movement and between tool cutting and relief directions, a drive shaft rotatably mounted in said structure and having a pinion secured thereto, a rack secured to said head and in constant mesh with said pinion, means including a clutch to drive said shaft for sliding said head in the tool advance direction, first cylinder and piston means having a linkage connection with said clutch and also having another linkage connection with said tool slide, a feed shaft having a cam and rotatably mounted on said structure, means to rotate said cutting shaft in a tool feed direction, a follower for said cam having a connection with the second-named linkage whereby rotation of said feed shaft in said cutting direction indexes said slide toward the workpiece, valve means in communication with said first cylinder and piston means, an adjustable stop carried on said head and engageable with said valve means at the end of an advance stroke to cause said first cylinder and piston means to disengage said clutch and move said slide to a relief position, metering means between said feed shaft and said structure and operative by said head at the end of the advance stroke to free said feed shaft for indexing, and a second cylinder and piston means connected between said head and said structure to move said head in the return direction, said valve means also being operative by said head at the end of a tool return stroke to cause said first cylinder and piston means to engage said clutch and move said slide to a cutting position.

6. A thread chasing attachment comprising, a support structure, a head reciprocatingly mounted on said structure for movement adjacent a workpiece in tool advance and tool return directions, said head including a tool slide mounted thereon for reciprocation in a direction substantially normal to said head movement and between tool cutting and relief directions, a drive shaft rotatably mounted in said structure and having a pinion secured thereto, a rack secured to said head and in constant mesh with said pinion, means including a clutch to drive said shaft for sliding said head in the tool advance direction, first cylinder and piston means having a linkage connection with said clutch and also having another linkage connection with said tool slide, a feed shaft having a cam and rotatably mounted on said structure, means to rotate said feed shaft in a tool cutting direction, a follower for said cam having a connection with the second-named linkage whereby rotation of said feed shaft in said cutting direction indexes said slide toward the workpiece, valve means in communication with said first cylinder and piston means, an adjustable stop carried on said head and engageable with said valve means at the end of an advance stroke to cause said first cylinder and piston means to disengage said clutch and move said slide to a relief position, a ratchet wheel secured to said feed shaft, a catch lever swingably mounted on said structure and engageable with said wheel and operatively by said head at the end of the advance stroke to free said feed shaft for indexing, a second cylinder and piston means connected between said head and said structure to move said head in the return direction, said valve means also being operative by said head at the end of a tool return stroke to cause said first cylinder and piston means to engage said clutch and move said slide to a cutting position, and means carried by said feed shaft and operative at the end of a predetermined number of advance strokes to completely disengage said lever.

7. A thread chasing attachment comprising, a support structure, a head reciprocatingly mounted on said structure for movement adjacent a workpiece in tool advance and tool return directions, said head including a tool slide mounted thereon for reciprocation in a direction substantially normal to said head movement and between tool cutting and relief directions, a drive shaft rotatably mounted in said structure and having a pinion secured thereto, a rack secured to said head and in constant mesh with said pinion, means including a clutch to drive said shaft for sliding said head in the tool advance direction, first cylinder and piston means having a linkage connection with said clutch and also having another linkage connection with said tool slide, a feed shaft having a cam and rotatably mounted on said structure, means to rotate said feed shaft in a tool cutting direction, a follower for said cam having a connection with the second-named linkage whereby rotation of said feed shaft in said cutting direction indexes said slide toward the workpiece, valve means in communication with said first cylinder and piston means, an adjustable stop carried on said head and engageable with said valve means at the end of an advance stroke to cause said first cylinder and piston means to disengage staid clutch and move said slide to a relief position, metering means between said feed shaft and said structure and operative by said head at the end of the advance stroke to free said feed shaft for indexing, a second cylinder and piston means connected between said head and said structure to move said head in the return direction, said valve means also operative by said head at the end of a tool return stroke to cause said first cylinder and piston means to engage said clutch and move said slide to a cutting position, a releasable arm rotatably mounted on said feed shaft and shiftable between clutch engaged and disengaged positions, and a trip secured to said feed shaft and rotatable therewith, said trip engageable with said arm to shift the latter to the clutch disengaged position after said metering means has permitted said feed shaft to rotate through is complete cycle.

8. A thread chasing attachment comprising, a support housing, a head reciprocatingly mounted in said housing for movement in tool advance and tool return directions, said head including a tool slide mounted thereon for reciprocation in a direction substantially normal to said head movement to vary the depth of tool cut and provide tool relief, drive means between said head and housing for sliding said head in the tool advance direction adjacent a workpiece, a clutch for said drive means, power operated means, a linkage connection between staid power operated means and said clutch, another linkage connection between said power operated means and said tool slide, valve means for said power operated means and operative by said head at the end of a tool advance stroke to cause said power operated means to disengage said clutch and move said tool slide to a tool relief position, and second power operated means to move said tead in the tool return direction when said clutch is disengaged, said valve means being operative by said head at the end of a tool return stroke to cause said power operated means to engage said clutch and move said tool slide to a cutting position.

9. A thread chasing attachment comprising, a support housing, a head reciprocatingly mounted in said housing for movement in tool advance and tool return directions, said head including a tool slide mounted thereon for reciprocation in a direction substantially normal to said head movement to vary the depth of tool cut and provide tool relief, drive means between said head and said housing for sliding said head in the tool advance direction over a workpiece, a clutch for said drive means, power operated means, a linkage connection between said power operated means and said clutch, another linkage connection between said power operated means and said tool slide, the second-named linkage construction including means adapted to receive interchangeable cam plates for cutting either tapered or straight threads, valve means for said power operated means and operative by said head at the end of a tool advance stroke to cause said power operated means to disengage said clutch and move said tool slide to a tool relief position, second power operated means to move said head in the tool return direction when said clutch is disengaged, said valve means operative by said head at the end of a tool return stroke to cause said power operated means to engage said clutch and move said tool slide to a cutting position, metering means mounted on said housing and actuatable at the end of each cutting stroke to advance said tool slide in increments and thereby increase the depth of cut for each stroke, and means controllably actuated by said metering means after the latter has provided a predetermined number of incremental tool movements to prevent further engagement of said clutch.

References Cited in the file of this patent

UNITED STATES PATENTS

| | | |
|---|---|---|
| 1,367,459 | Carson | Feb. 1, 1921 |
| 2,240,506 | Levesque | May 6, 1941 |
| 2,576,095 | Beninghoff | Nov. 27, 1951 |
| 2,808,598 | Mannaioni | Oct. 8, 1957 |